United States Patent [19]

Eads et al.

[11] 4,408,016

[45] Oct. 4, 1983

[54] MONOMERIC COMPOSITION OF A DIOL BIS(ALLYL CARBONATE), A DISPERSED POLYMER, AND A MULTIFUNCTIONAL ACRYLATE MONOMER, AND POLYMERS PREPARED THEREFROM

[75] Inventors: Carl W. Eads, Wadsworth; Ronald L. Haynes, Akron, both of Ohio

[73] Assignee: PPG Industries, Inc., Pittsburgh, Pa.

[21] Appl. No.: 362,705

[22] Filed: Mar. 29, 1982

[51] Int. Cl.³ .............................................. C08L 47/00
[52] U.S. Cl. ..................... 525/277; 264/2.6;
264/176 R; 264/176 F; 264/209.6; 264/319;
264/328.2; 264/331.13; 264/347
[58] Field of Search ......................................... 525/277

[56] References Cited

U.S. PATENT DOCUMENTS

| | | | |
|---|---|---|---|
| 3,955,015 | 5/1976 | Ohtsuka et al. | 427/163 |
| 4,217,433 | 8/1980 | Dyball | 525/277 |
| 4,346,197 | 8/1982 | Crano et al. | 525/198 |

*Primary Examiner*—Stanford M. Levin
*Attorney, Agent, or Firm*—Richard M. Goldman

[57] ABSTRACT

Discloses a monomeric composition and the polymeric product thereof. The composition contains a major portion of diol bis(allyl carbonate) monomer, and effective amounts of a multifunctional acrylate monomer, and a viscosity increasing polymer. Also disclosed is a method of reducing the haze in polymeric compositions of (a) a diol bis(allyl carbonate) and (b) a viscosity increasing polymer, by the addition of a multifunctional arcylate monomer to the monomeric composition prior to the polymerization thereof.

21 Claims, No Drawings

MONOMERIC COMPOSITION OF A DIOL BIS(ALLYL CARBONATE), A DISPERSED POLYMER, AND A MULTIFUNCTIONAL ACRYLATE MONOMER, AND POLYMERS PREPARED THEREFROM

DESCRIPTION OF THE INVENTION

Castings of diol bis(allyl carbonate) are characterized by hardness, optical clarity and long cure times. The commonly assigned copending U.S. application Ser. No. 219,063, filed Dec. 22, 1980, now U.S. Pat. No. 4,346,197, of John C. Crano et al for METHOD OF POLYMERIZING BLENDS OF BIS(ALLYL CARBONATE) MONOMERS WITH POLYMERS AND POLYMER BLENDS PREPARED THEREBY describes how the addition of high molecular weight polymers to the diol bis(allyl carbonate) monomer results in a composition that may be drawn, extruded, injection molded or the like, and is characterized by pseudoplastic rheology, by shorter cure times, and in some cases, an increase in haze.

It has now been found that the addition of a multifunctional acrylate monomer to the monomeric composition of diol bis(allyl carbonate) and dispersed polymer provides a monomeric composition that cures quickly from a pseudoplastic to a substantially non-malleable, substantially nonductile composition capable of supporting its own weight without deformation, which may be thereafter cured to a hard resin remote from molds.

The addition of the dispersed polymer to the monomeric diol bis(allyl carbonate) causes some degree of haze and some reduction in luminous transmission in the resulting polymer. It has now further been found that certain of the multifunctional acrylates, as will be described more fully hereinbelow, result in a significant reduction of haze and significant increase of luminous transmission in the presence of the dispersed polymer.

DETAILED DESCRIPTION OF THE INVENTION

It has now been found that a polymerizate of diol bis(allyl carbonate) prepared by dispersing a viscosity increasing amount of a viscosity increasing polymer in the monomeric diol bis(allyl carbonate) monomer whereby to provide a pseudoplastic material, including liquid pseudoplastic materials, may have the cure thereof to a substantially rigid polymeric composition accelerated by the addition of monomeric acrylate cross-linking agents to the monomeric composition. Moreover, it has been found that the addition of certain monomeric acrylate crosslinking agents, exemplified by diacrylate monomers, to the composition results in reduced haze and increased luminous transmittance in the fully cured polymer relative to that of a fully cured polymer characterized by the substantial absence of polyfunctional cross-linking agents.

As herein contemplated a monomeric composition is prepared containing (a) a diol bis(allyl carbonate), (b) a viscosity increasing amount of a dispersed viscosity increasing polymer to form a pseudoplastic composition, which may be a pseudoplastic liquid composition, the monomeric composition becoming pseudoplastic either upon addition and dispersion of the polymer, or subsequent to the addition and dispersion thereof with partial cure, and (c) a polyfunctional acrylate cross-linking agent. In a particularly preferred exemplification, the polyfunctional acrylate cross-linking agent is selected so as to serve as an optical compatibilizing agent, reducing the haze and increasing the luminous transmittance of the polymerizate prepared therefrom.

Thereafter, the monomeric composition of (a) diol bis(allyl carbonate) monomer, (b) viscosity enhancing dispersed polymer, and (c) polyfunctional acrylate crosslinking agent is polymerized, e.g., by the addition of free-radical polymerization initiator with heating to temperatures sufficient to provide a satisfactory rate of polymerization for initiators present therein.

According to a still further exemplification of this invention, there is provided a polymeric material prepared by the polymerization of a monomeric composition of (a) diol bis(allyl carbonate), (b) a viscosity enhancing amount of dispersed, viscosity increasing polymer, and (c) a multifunctional acrylate cross-linking agent.

The polymeric composition herein contemplated finds utility as an element of optical systems, as an opthalmic lens, as a fiber optic material, as supporting material for a fiber optic system, and for various other applications where transparency, substantial absence of haze, high luminous transmittance, and hardness are desired in the finished product, pseudoplastic rheology is desired during fabrication, and a rapid rate of initial cure is desired after formation into the desired shape or structure.

By "haze" is meant the percentage of transmitted light which in passing through the polymerized material deviates from the incident beam by forward scattering by an amount greater than 2.5 degrees, as measured in accordance with ANSI/ASTM D-1003-61 (Reapproved 1977) *Standard Test Method for Haze and Luminous Transmittance of Transparent Plastics.*

By "luminous transmittance" is meant the ratio of transmitted light to incident light as determined by the method in the aforementioned American National Standards Institute/American Society for Testing and Materials Standard.

Diol bis(allyl carbonate) monomers which may be utilized to form the monomeric and polymeric compositions of this invention and which may be polymerized by the method of this invention are normally linear, aliphatic liquid allyl carbonates, i.e., glycol bis(allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, alkylene polyether or alkylene carbonate group having from 2 to 10 carbons and oxygens. These diol bis(allyl carbonate) monomers are represented by the formula:

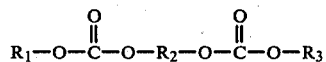

where $R_1$ and $R_3$ are allyl or substituted allyl groups, and $R_2$ is as defined below. $R_1$ and $R_3$ are independently represented by the formula:

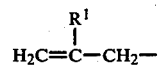

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$, alkylene polyether groups such as $-CH_2CH_2-O-CH_2CH_2-O-CH_2CH_2-$, $-CH_2-O-CH_2CH_2O-CH_2CH_2-$, and $-CH_2-O-CH_2-$ groups, and alkylene carbonate and alkylene polycarbonate groups such as $-CH_2CH_2-O-CO-O-CH_2CH_2-$ and $-CH_2CH_2-O-CH_2CH_2-O-CO-O-CH_2CH_2-O-CH_2CH_2-$ groups. Most commonly, $R_2$ is $-CH_2CH_2-$, $-CH_2CH_2-O-CH_2CH_2-$, or $-CH_2CH_2-O-CH_2CH_2-O-CH_2CH_2-$.

Specific examples of diol bis(allyl carbonate) monomers useful in the practice of the invention herein contemplated include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

Commercially important diol bis(allyl carbonate) monomers which may be utilized in the invention herein contemplated are:

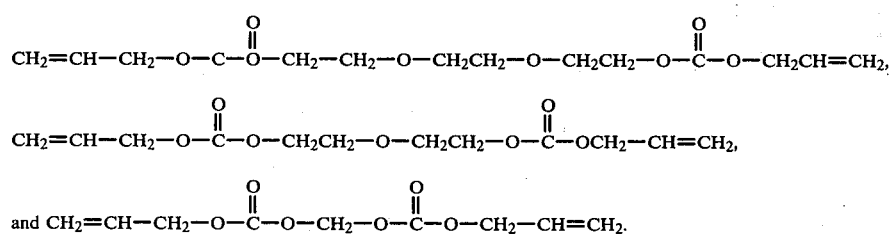

The compositions herein contemplated contain bis(allyl carbonate) monomer, a viscosity increasing amount of a viscosity increasing polymer, and a polyfunctional acrylate monomer. For example, the contemplated composition may be a composition of diol bis(allyl carbonate), a viscosity increasing polymer, most commonly poly(methyl methacrylate) or a copolymer of methyl methacrylate and allyl methacrylate, and multifunctional acrylate monomer, most commonly a diacrylate. The polymer is either soluble in the bis(allyl carbonate), swollen by the bis(allyl carbonate), or swollen by and partially soluble in the bis(allyl carbonate).

The multifunctional acrylate monomer is a cross-linking agent, decreasing the time after commencement of cure that the composition is pseudoplastic, and thereby decreasing the amount of cure that must be carried out in a mold.

Moreover, many multifunctional acrylate monomers useful as cross-linking agents have the further advantage of optically compatibilizing the polymer, i.e., reducing the haze of the polymer and increasing the luminous transmittance thereof.

The multifunctional acrylate monomers useful as cross-linking agents and optical compatibilizing agents have the formula

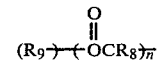

where

is an acrylic acid moiety chosen from the group consisting of acrylic acid,

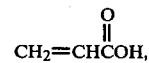

methacrylic acid,

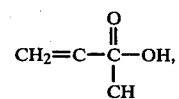

and ethylacrylic acid,

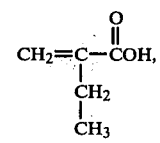

and $R_9(OH)_n$ is a polyol. $R_9(OH)$ may be a diol, a triol, a tetra carbanol, or a penta carbanol. Most commonly $R_9(OH)_n$ is a diol or triol. Typical diols useful providing the terminal diacrylate esters include alpha, omega-glycols such as ethylene glycol, trimethylene glycol, 1,4-butanediol, 1,5-pentane diol and 1,6-hexanediol, other 1,2 glycols, such as propylene glycol, the hydrated ethylene oxide and propylene oxide condensation products, such as diethylene glycol, triethylene glycol, tetraethylene glycol, dipropylene glycol, tripropylene glycol, tetrapropylene glycol, and the like. Exemplary diacrylates include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylene glycol diacrylate, trimethylene glycol dimethacrylate, butane diol diacrylate, butane diol dimethacrylate, pentane diol diacrylate, pentane diol dimethacrylate, hexane diol diacrylate, hexane diol dimethacrylate, propylene glycol diacrylate, propylene glycol dimethacrylate, dipropylene glycol diacrylate, dipropylene glycol dimethacrylate, tripropylene glycol diacrylate, trooropylene glycol dimethacrylate, tetrapropylene glycol diacrylate, tetrapropylene glycol, and the like.

Suitable triacrylates include trimethylolpropane triacrylate, trimethyolpropane trimethacrylate, glycerol triacrylate, glycerol trimethacrylate, pentaerythritol triacrylate, and pentaerythritol dimethacrylate. Suitable tetra acrylates include pentaerythritol tetra acrylate and pentaerythritol tetramethacrylate.

Difunctional monomers, i.e., diacrylates and dimethacrylates, are preferred as optical compatibilizing agents. Preferred compatibilizing agents are the diacrylates and dimethacrylates of aliphatic diols. Especially preferred diol diacrylates and dimethacrylates are those having from about 4 to about 15 atoms, i.e., carbon atoms or carbon and oxygen atoms, between the carboxyl carbon atoms. Exemplary diacrylates and dimethacrylates have the structures represented by

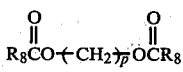

where 1 is from 1 to 4, m is from 1 to 4 when $(C_3H_6O)$ is chosen from

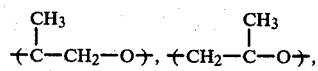

and mixtures thereof, m is from 1 to 3 when $(C_3H_6O)$ is $-(CH_2CH_2CH_2O)-$ and p is from 1 to 13.

The amount of multifunctional acrylate monomer in the composition is a function of the desired cure rate of the monomeric composition and the desired degree of clarity, i.e., transmittance and haze, of the polymer. The concentration is either an amount sufficient to reduce the haze to or below the amount when there is no multifunctional acrylate monomer in the composition, or an amount sufficient to provide a rapid cure. The concentration thereof may be expressed in terms of parts of monomer per hundred parts of diol bis(allyl carbonate) or in terms of parts of monomer per part of dispersed polymer. Generally the amount of multifunctional polymer is from about 1 part per hundred parts of diol bis(allyl carbonate) to about 20 parts per hundred parts of diol bis(allyl carbonate).

By a viscosity increasing polymer is meant a polymer which, at the concentrations of polymer and polymer molecular weight herein contemplated, provides a composition of polyol(allyl carbonate) and polymer having a viscosity high enough to provide pseudoplastic rheology. By a "pseudoplastic rheology" is meant a viscosity that decreases with increasing shear stress a shear rate. The composition may be liquid or a gum, gel, or the like. The monomeric compositions herein contemplated have a shear stress that increases from about $10^4$ to about $10^7$ dynes per square centimeter at shear rates increasing from $10^1$ to $10^4$ per second, and viscosities decreasing from about $10^5$ centipoise at low shear rates to about $10^4$ centipoise at high shear rates.

For the applications herein contemplated, e.g., opthalmic lenses, photographic lenses, fiber optics, fiber optic fittings, and the like, the polymer should be optically compatible with the bis(allyl carbonate). That is, it should not form haze in the bis(allyl carbonate) polymerizate. The tendency of the polymer to form a haze is reduced by the addition of the multifunctional acrylate monomer, as is described hereinabove.

Moreover, the polymer should be resistant to destruction by the peroxy initiators used to polymerize the bis(allyl carbonate), and not interfere therewith.

The amount of dispersed polymer in the bis(allyl carbonate) monomer is an amount sufficient to provide the desired characteristics and properties in the monomeric composition, or during casting, or in the partially cured polymerizate, or in the finally cured polymerizate, or in any combination thereof. This is generally from 1 to about 100 parts of dispersed polymer per 100 parts of diol bis(allyl carbonate), and preferably from about 1 to about 35 parts of dispersed polymer per 100 parts of diol bis(allyl carbonate).

As herein contemplated, the polymer may be the polymer of a monofunctional homomonomer or a copolymer of monofunctional monomers, or a copolymer of a monofunctional monomer and a difunctional monomer. Preferably the difunctional monomer has functional groups of high and low reactivity, e.g., an acrylic group and an allyl group, and the monofunctional monomer is an acrylic monomer.

The dispersed, viscosity enhancing polymer is generally an acrylate polymer. It may be chosen from the group consisting of homopolymers of acrylic acids, homopolymers of low alkyl alcohol esters of acrylic acids, copolymers of allyl alcohol esters of acrylic acids with acrylic acids, and copolymers of allyl alcohol esters of acrylic acids, where acrylic acids, allyl alcohols, and low allyl alcohols are as defined herein.

Preferably the copolymer is a copolymer of (a) an acrylate, i.e., an acrylate ester or an acrylic acid, and (b) an ester of an acrylic acid and an allyl alcohol or substituted allyl alcohol having the formula:

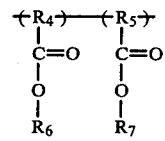

where

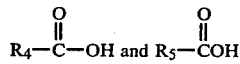

independently are acrylic acids, as acrylic acid, methacrylic acid, ethyl acrylic acid, butyl acrylic acid, propyl acrylic acid, and higher acrylic acids. $R_6OH$ is an allyl alcohol or substituted allyl alcohol, having the formula:

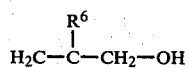

where $R^6$ is chosen from the group consisting of hydrogen, halogen, and $C_1$ to $C_4$ alkyls. Most frequently $R_6OH$ is allyl alcohol,

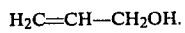

$R_7$ may be a $C_1$ to $C_4$ alkyl or hydrogen.

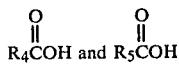

are independently either acrylic acid;

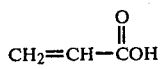

or methacrylic acid

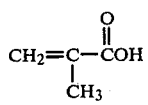

For example, the difunctional monomer may be allyl acrylate, allyl methacrylate, or the like, and the monofunctional monomer may be methyl acrylate, methyl methacrylate, ethyl acrylate, ethyl methacrylate, or the like. In this way there is provided a linear, minimally cross linked, soluble, swellable polymer, with polymerization predominantly through the vinyl groups.

One particularly desirable copolymer is a copolymer of methyl methacrylate and allyl methacrylate. In a preferred exemplification the copolymer contains from about 80 to about 99 weight percent methyl methacrylate and balance allyl methacrylate. It should be recognized, however, that as the degree of saturation in the dispersed polymer increases, the tendency for haze formation increases, necessitating greater amounts of the multifunctional acrylate monomer for haze reduction. Especially preferred is a copolymer containing up to 97 weight percent methyl methacrylate, balance allyl methacrylate, and an apparent molecular weight of 100,000 and preferably above about 250,000 to above about 600,000 or even above about 800,000 determined by inherent viscosity versus poly(methyl methacrylate).

Especially preferred copolymers with olefinic unsaturation, i.e., copolymers of an acrylate and an allyl acrylate, are those having a macromolecule molecular weight above about 100,000, and especially from about 250,000 to above about 800,000. These copolymers are characterized by a low rate of solubilization in and swelling by the polyol(allyl carbonate) monomer. As a consequence, in order to obtain high levels thereof in the final polymerizate, e.g., above about 15 parts of polymer per part of diol bis(allyl carbonate) up to about 100 parts of monomer per part of allyl carbonate, they are usually first solubilized in or swollen by a suitable solvent, e.g., methylene chloride, and thereafter admixed with polyol(allyl carbonate) and the solvent subsequently recovered therefrom.

Alternatively, the polymer may be a homopolymer of a monomer having mono-olefinic unsaturation, poly(acrylic acid), poly(methacrylic acid), poly(methyl acrylate), poly(ethyl acrylate), poly(butyl acrylate), poly(methyl methacrylate), poly(ethyl methacrylate), poly(butyl methacrylate) and copolymers thereof.

The polymer may be added directly to the diol bis(allyl carbonate) monomer. Alternatively, the polymer may be added to an organic solvent, e.g., methylene chloride, whereby to form a solution. When the polymer is added to an organic solvent, the diol bis(allyl carbonate) monomer is added to the solution, and the solvent driven off, e.g., by distillation, evaporation, boiling, or the like.

According to another exemplification the polymer is first added to a solvent, and the diol bis(allyl carbonate) is added to the resulting solvent. The especially preferred solvents are those solvents having a solubility parameter of about 9.0 to about 10.0 (calories/cubic centimeter)$^{-0.5}$, where the solubility parameter is the square root of the cohesive energy density, as described in F. Rodriquez, *Principles of Polymer Systems*, McGraw-Hill Book Co., New York, N.Y. (1970), and Beerbower, Kaye, and Pattison, *Chem. Engr.*, Dec. 18, 1967, page 118.

Exemplary solvents include halogenated hydrocarbons, such as methylene chloride, chloroform, dichloroethylene, ethylene dichloride, tetrachloroethane, tetrachloroethylene, trichloroethane, trichloroethylene, aromatics, such as benzene, nitrobenzene, orthodichlorobenzene, styrene, and chlorobenzene, and hydrocarbons. Alternatively, other solvents such as benzaldhyde, carbon disulfide, chlorobromomethane, cyclohexanone, ethyl chloroformate, diethylene glycol, diphenyl, turpentine, cyclohexane, isooctane, and the like may be used.

The polymerization of the polyol(allyl carbonate) composition is initiated by the creation of active centers, e.g., free radicals, carbanions, and carbonium ions. Useful free radical initiators are peroxy initiators. The peroxy initiators include: isobutyryl peroxide; di(2-ethylhexyl) peroxydicarbonate; acetyl cyclohexane sulfonyl peroxide; di(sec-butyl) peroxydicarbonate; diisopropyl peroxydicarbonate; 2,4-dichlorobenzoyl peroxide, t-butyl peroxypivalate; decanoyl peroxide; lauroyl peroxide, propionyl peroxide; 2,5-dimethyl-2,5-bis(2-ethyl hexylperoxy) hexane; acetyl peroxide; succinic acide peroxide; t-butyl peroxyoctoate; benzoyl peroxide; p-chlorobenzoyl peroxide; t-butyl peroxyisobutyrate; t-butyl peroxymaleic acid; bis(1-hydroxycyclohexyl) peroxide, 1-hydroxy-1'-hydroperoxy dicyclohexyl peroxide; t-butyl peroxyisopropyl carbonate; 2,5-dimethyl-2,5-bis(benzoylperoxy) hexane; t-butyl peroxyacetate; methyl ethyl ketone peroxides; di-t-butyl diperoxyphthalate and t-butyl peroxybenzoate.

Especially preferred peroxy initiators are those that do not discolor, char, or burn the resulting polymerizate. Exemplary are diisopropyl peroxydicarbonate and benzoyl peroxide.

The fully cured polymerizates herein contemplated are nonelastomeric, rigid, hard resins formed by the polymerization of polar monomers in the presence of a polymer of polar monomers. For certain applications the polymerizates herein contemplated may be characterized by a 0-15 second Barcol hardness above about 25-20, e.g., preferably above about 35-30. The polymerizates herein contemplated are further characterized by a luminous transmission of above about 90 percent and a haze below about 10 percent, both determined by ANSI/ASTM Standard D-1003-61 (Reapproved 1977), *Standard Test Method for Haze and Luminous Transmittance of Transparent Plastics.*

According to one exemplification herein contemplated, a liquid composition is prepared containing (a)

diethylene glycol bis(allyl carbonate), (b) from about 2 to about 10 parts per hundred (basis diethylene glycol bis(allyl carbonate)) of either a copolymer containing above about 90 weight percent methyl methacrylate balance allyl methacrylate, or a homopolymer of methyl methacrylate, the polymer having a viscosity average molecular weight of from about 100,000 to about 800,000, and (c) from about 2 to about 10 parts per hundred (basis diethylene glycol bis(allyl carbonate)) of tripropylene glycol diacrylate. The polymer and diacrylate monomer are dispersed in the diethylene glycol bis(allyl carbonate) monomer by mechanical mixing whereby to yield a substantially clear, liquid composition having a viscosity above about 100 poise. Thereafter, initiator, for example, isopropylperoxydicarbonate is added thereto at about 1.5 to about 3.5 parts per hundred parts of diethylene glycol bis(allyl carbonate) and dispersed therein. Thereafter the material may be heated over a period of about 10 to 24 hours whereby to yield a hard resin. The curing may be effectuated in opthalmic molds, between molds, cathode ray tube covers, or other means so as to form a flat sheet or plate, or a shaped or curved sheet or plate. Alternatively, prior to curing, the composition may be extruded or drawn down to form a fiber optic, surrounded with a high refractive index or reflective material, and cured.

The following examples are illustrative of this invention.

EXAMPLE I

A series of tests were conducted to determine the effect of the addition of various multifunctional acrylate monomers on polymers prepared from a composition of diethylene glycol bis(allyl carbonate) with poly(methyl methacrylate) dispersed therethrough.

For each test 78.4 grams of PPG Industries, Inc. CR-39 ® brand diethylene glycol bis(allyl carbonate) was weighed into a 400 milliliter beaker, to which was added 20 grams of poly(methyl methacrylate) having a viscosity average molecular weight of about 500,000, and 200 milliliters of $CH_2Cl_2$. The composition of monomer, polymer, and solvent was stirred with a magnetic stirrer until all of the solids appeared to be dispersed. Thereafter, 1.6 grams of benzoyl peroxide was added to the composition, and stirring was continued until the benzoyl peroxide appeared to be dispersed. Thereafter, 4 grams of the multifunctional acrylate shown in Table I was added dropwise, and 2 grams of a solution of 0.4 gram of isopropyl peroxy dicarbonate in diethylene glycol bis(allyl carbonate) was added to each sample.

Each sample was then evaporated in a rotary vacuum evaporator for two hours, and thereafter stored at 40° F. (5° C.) until the polymerization tests were conducted.

The first series of polymerization tests were carried out by placing a portion of each sample between two four incy by seven inch glass plates separated by a one-eighth inch rubber gasket, clamping the two glass sheets together, maintaining the samples at 27 to 30 degrees Centigrade for 16 hours, removing the samples from between the glass sheets, and heating portions of each sample to 100 degrees Centigrade for six minutes. The results shown in Table I, below, were obtained.

TABLE I

| Multifunctional Acrylate | Appearance of Polymer |
| --- | --- |
| Trimethylolpropane trimethacrylate | opaque |
| Trimethylolpropane triacrylate | opaque |
| Pentaerythritol triacrylate | opaque |

TABLE I-continued

| Multifunctional Acrylate | Appearance of Polymer |
| --- | --- |
| Tripropylene glycol diacrylate | clear |
| Tetraethylene glycol diacrylate | clear |
| Hexanediol diacrylate | clear |

EXAMPLE II

A second series of polymerization tests were conducted using the monomer compositions prepared in Example I. This series of polymerization tests were carried out by placing portions of each sample between two four inch by seven inch glass plates separated by a one-eighth inch thick rubber gasket, clamping the two glass sheets together, maintaining the samples at 27 to 30 degrees Centigrade for sixteen hours, removing the samples from between the glass sheets, and heating portions of each sample according to the cure cycle shown in Table II below:

TABLE II

Time-Temperature Sequence for Benzoyl Peroxide Cure

| Cumulative Time (Hours) | Temperature, °C. |
| --- | --- |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 |

The results shown in Table III, below, were obtained:

TABLE III

| Multifunctional Acrylate | Appearance of Polymer |
| --- | --- |
| Trimethylolpropane trimethacrylate | opaque |
| Trimethylolpropane triacrylate | opaque |
| Pentaerythritol triacrylate | opaque |
| Tripropylene glycol diacrylate | slight haze |
| Tetraethylene glycol diacrylate | " |
| Hexanediol diacrylate | " |

EXAMPLE III

The procedure of Example II was repeated, except that the samples were maintained between the glass sheets during the eighteen hour benzoyl peroxide cure. The resulting one-eighth inch thick polymer sheets were tested according to ANSI/ASTM D-1003-61 (Reapproved), Haze and Luminous Transmittance of Transparent Plastics, and for fifteen second Barcol hardness. The results shown in Table IV, below, were obtained:

TABLE IV

| Multifunctional Acrylate | Luminous Transmittance | Haze | Barcol Hardness (15 second) |
| --- | --- | --- | --- |
| Tripropylene glycol diacrylate | 88.2% | 5.3% | 46-36 |
| Tetraethylene glycol diacrylate | 85.1% | 13.4% | 42-32 |
| Trimethylolpropane trimethacrylate | 68.4% | 43.5% | 47-39 |
| Trimethylolpropane triacrylate | 61.3% | 70% | 42-33 |

EXAMPLE IV

A series of tests were conducted to determine the effect of the levels of dipropylene glycol diacrylate and poly(methyl methacrylate) in benzoyl peroxide cured diethylene glycol bis(allyl carbonate) polymerizates.

In each test 100 grams of PPG Industries, Inc. CR-39® diethylene glycol bis(allyl carbonate) was weighed into a beaker, to which was added a measured quantity of poly(methyl methacrylate) having a viscosity average molecular weight of above 500,000, and 200 milliliters of $CH_2Cl_2$. The compositions were stirred on a magnetic stirrer. Thereafter tripropylene glycol diacrylate and 3 grams of benzoyl peroxide were added to each of the compositions with continued stirring until the solids had dissolved.

Each composition was then poured into a crystallizing dish and a stream of air was passed over the crystallizing dish to drive off the solvent. Thereafter each composition was maintained in a vacuum at 25 to 30 degrees Centigrade for about sixteen hours to drive off the solvent.

Each composition was then poured between two four inch by eight inch sheets of glass separated by a one-eighth inch rubber gasket and cured according to the eighteen hour cure cycle shown in Table II of Sample II. After cure, each sample was tested for luminous transmission, haze, and fifteen second Barcol hardness. The results are shown in Table V below:

TABLE V

Haze, Luminous Transmission, and Barcol Hardness versus Tripropylene glycol diacrylate and Polymethylmethacrylate Concentrations

| Tripropylene glycol diacrylate parts per hundred | 0 | 5 | 10 |
|---|---|---|---|
| polymethyl methacrylate parts per hundred | | | |
| 5 parts per hundred | | | |
| Haze | 48.8% | 22.3% | 14.1% |
| Luminous Transmission | 85.3% | 89.9% | 89.9% |
| Barcol Hardness | 41–33 | 34–25 | 40–31 |
| 10 parts per hundred | | | |
| Haze | 35.2% | 17.4% | 14.8% |
| Luminous Transmission | 88.9% | 89% | 89.3% |
| Barcol Hardness | 39–30 | 40–31 | 42–32% |
| 20 parts per hundred | | | |
| Haze | | 9.4% | 3.8% |
| Luminous Transmission | | 87.1% | 88.1% |
| Barcol Hardness | | 42–33 | 16–0 |

EXAMPLE V

A series of tests were conducted to determine the effect of levels of tripropylene glycol diacrylate on polymers prepared by the isopropyl peroxydicarbonate initiated polymerization of diethylene glycol bis(allyl carbonate) having poly(methyl methacrylate) dispersed therethrough.

In each test 86 grams of PPG Industries, Inc. CR-39® diethylene glycol bis(allyl carbonate) was weighed into a beaker with 5 grams of poly(methyl methacrylate) having a viscosity average molecular weight above 500,000, and 100 milliliters of $CH_2Cl_2$. The amount of tripropylene glycol diacrylate shown in Table VII, below, was then added to the composition. The composition was stirred on a magnetic stirrer until all of the solid appeared to be dispersed. Thereafter 17.5 grams of a solution prepared from 14 grams of the diethylene glycol bis(allyl carbonate) monomer and 3.5 grams of diisopropyl peroxy dicarbonate was added to the composition, with continued stirring.

Each composition was then poured onto a crystallizing dish and a stream of air was passed over the crystallizing dish to drive off the $CH_2Cl_2$ solvent. Thereafter each composition was maintained in a vacuum at 25 to 30 degrees Centigrade for about sixteen hours to drive off remaining solvent.

Each composition was then poured between two four inch by eight inch sheets of glass separated by a one-eighth inch thick rubber gasket, and cured according to the cure cycle in Table VI, below:

TABLE VI

Time-Temperature Sequence for Diisopropyl Peroxydicarbonate Cure

| Cumulative Time (hours) | Temperature, °C. |
|---|---|
| 0 | 42 |
| 4 | 44 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 84 |
| 24 | 98 |
| 24.1 | 100 |

After cure each sample was tested for haze, luminous transmission, and Barcol hardness as described in Example III, above. The following results were obtained:

TABLE VII

Haze, Luminous Transmission, and Barcol Hardness versus Tripropylene Glycol Diacrylate Concentration

| | Tripropylene Glycol Diacrylate (parts per hundred parts of diethylene glycol bis(allyl carbonate) at 5 parts of poly(methyl methacrylate) per hundred parts of diethylene glycol bis (allyl carbonate).) | |
|---|---|---|
| | 0 | 5 |
| Haze | 15.6% | 5.8% |
| Luminous Transmission | 90.7% | 92.2% |
| Barcol Hardness (15 second) | 15–2 | 27–16 |

EXAMPLE VI

The procedure of Example V, above, was followed except that the addition, use and evaporation of the $CH_2Cl_2$ was not performed. The resulting compositions were cured and tested as described in Example V, above, and the results shown in Table VIII, below, were obtained:

TABLE VIII

Haze, Luminous Transmission, and Barcol Hardness versus Tripropylene glycol diacrylate concentration

| | Tripropylene Glycol Diacrylate (parts per hundred parts of diethylene glycol bis(allyl carbonate) at 5 parts of poly(methyl methacrylate) per hundred parts of diethylene glycol bis (allyl carbonate).) | | |
|---|---|---|---|
| | 0 | 5 | 10 |
| Haze | 36.2% | 12.2% | 5.3% |
| Luminous Transmission | 88.4% | 91.5% | 91.2% |

TABLE VIII-continued

Haze, Luminous Transmission, and Barcol Hardness versus Tripropylene glycol diacrylate concentration

| | Tripropylene Glycol Diacrylate (parts per hundred parts of diethylene glycol bis(allyl carbonate) at 5 parts of poly (methyl methacrylate) per hundred parts of diethylene glycol bis (allyl carbonate).) | | |
|---|---|---|---|
| | 0 | 5 | 10 |
| Barcol Hardness (15 second) | 37–30 | 38–29 | 34–25 |

EXAMPLE VI

A series of tests were conducted to determine the effect of various levels of tripropylene glycol diacrylate on polymers prepared from diethylene glycol bis(allyl carbonate) having a copolymer of allyl methacrylate and methyl methacrylate dispersed therethrough.

A copolymer of allyl methacrylate and methylmethacrylate was prepared. The copolymer contained about 1 weight percent allyl methacrylate, balance methyl methacrylate, and had a viscosity average molecular weight above about 500,000.

One composition was prepared containing 95.2 grams of PPG Industries, Inc. CR-39® diethylene glycol bis(allyl carbonate), 4.8 grams of the allyl methacrylate-methyl methacrylate copolymer, and 3.3 grams of neat diisopropyl peroxy dicarbonate.

A second composition was prepared containing 101.9 grams of PPG Industries, Inc. CR-39® diethylene glycol bis(allyl carbonate), 5.1 grams of the allyl methacrylate-methyl methacrylate copolymer, 3.6 grams of neat isopropyl peroxy dicarbonate, and 5.1 grams of tripropylene glycol diacrylate.

Both solutions were poured between four inch by eight inch glass plates separated by one-eighth inch rubber gaskets, and cured according to the isopropyl peroxy dicarbonate cure cycle in Table VI of Example V, above. The polymerized products were then tested for luminous transmission and haze as described in Example III, above. The following results were obtained:

TABLE IX

Haze and Luminous Transmission versus Tripropylene Glycol Diacrylate Concentration

| | Tripropylene Glycol Diacrylate (parts per hundred parts of diethylene glycol bis(allyl carbonate) at 5 parts of poly (methyl methacrylate) per hundred parts of diethylene glycol bis (allyl carbonate).) | |
|---|---|---|
| | 0 | 5 |
| Haze | 14.0% | 1.3% |
| Luminous Transmission | 91.4% | 92.4% |

While the invention has been described with respect to certain exemplifications and embodiments, such description is only illustrative, the scope of the invention being defined by the claims appended hereto.

We claim:
1. A composition of matter comprising:
(a) an aliphatic diol bis(allyl carbonate);
(b) an acrylate polymer; and
(c) a multifunctional acrylate monomer.
2. The composition of claim 1 wherein said composition contains from about 1 part of polymer per hundred parts of diol bis(allyl carbonate) to about 100 parts of polymer per hundred parts of diol bis(allyl carbonate).
3. The composition of claim 1 wherein said composition contains from about 1 part of multifunctional acrylate monomer per hundred parts of diol bis(allyl carbonate) to about 20 parts of multifunctional acrylate monomer per hundred parts of diol bis(allyl carbonate).
4. The composition of claim 3 wherein said composition contains: (a) from about 1 part of acrylate polymer per hundred parts of diol bis(allyl carbonate) to about 35 parts of acrylate polymer per hundred parts of diol bis(allyl carbonate); and (b) from about 1 part of multifunctional acrylate monomer per hundred parts of diol bis(allyl carbonate) to about 20 parts of multifunctional acrylate monomer per hundred parts of diol bis(allyl carbonate); said composition having a pseudoplastic rheology with a shear stress of from $10^4$ to $10^7$ dynes per square centimeter at shear rates of from $10^1$ to $10^4$ per second.
5. The composition of claim 1 wherein the diol bis(allyl carbonate) monomer is represented by the formula

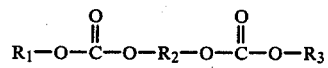

where $R_1$ and $R_3$ are allyl groups independently represented by the formula

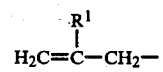

where $R^1$ is chosen from the group consisting of hydrogen, fluorine, chlorine, bromine, and $C_1$ to $C_4$ alkyl groups, and $R_2$ is chosen from the group consisting of alkylene groups, alkylene ether groups, alkylene polyether groups, alkylene carbonate groups, and mixtures thereof.
6. The composition of claim 1 wherein the copolymer is represented by the formula:

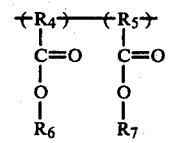

where $R_4$ (CO)OH and $R_5$ (CO)OH are independently, chosen from the group consisting of acrylic acid, methacrylic acid, ethyl acrylic acid, propyl acrylic acid, and butyl acrylic acid $R_6$(OH) is allyl alcohol, and $R_7$ is chosen from the group consisting of H, and $C_1$ to $C_4$ alkyl groups.
7. The composition of claim 1 wherein the multifunctional acrylate monomer is represented by the formula:

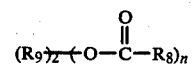

where n is from 2 to 5, $R_9$ is chosen from the group consisting of alkylene groups, alkylene ether groups, alkylene carbonate groups, and mixtures thereof; and $R_8$-(CO)OH is chosen from the group consisting of acrylic acid, methacrylic acid, ethyl acrylic acid, and mixtures thereof.

8. The composition of claim 1 wherein
(a) the diol bis(allyl carbonate) monomer is represented by the formula $$R_1-O-\overset{\overset{O}{\|}}{C}-O-R_2-O-\overset{\overset{O}{\|}}{C}-O-R_3;$$

(b) the acrylate polymer is represented by the formula:

$$\begin{array}{cc} -(R_4)- & -(R_5)- \\ | & | \\ C=O & C=O \\ | & | \\ O & O \\ | & | \\ R_6 & R_7 \end{array}$$

(c) the multifunctional acrylate monomer is represented by the formula $$(R_9)(O-\overset{\overset{O}{\|}}{C}-R_8)_n$$

where n is from 2 to 5;
(d) $R_1OH$, $R_3OH$, and $R_6OH$ are allyl alcohol and $R_7$ is chosen from the group consisting of H and $C_1$ to $C_4$ alkyl groups;
(e) $R_2$ and $R_9$ are independently chosen from the group consisting of
$-(CH_2CH_2)-$,
$-(CH_2CH_2OCH_2CH_2)-$,
$-(CH_2CH_2OCH_2CH_2OCH_2CH_2OCH_2CH_2)-$,
$-(C_3H_6)-$,
$-(C_3H_6OC_3H_6)-$,
$-(C_3H_6OC_3H_6OC_3H_6)-$, and mixtures thereof;
(f) $R_4$, $R_5$, and $R_8$ are independently chosen from the group consisting of
$CH_2=CH-$,
$CH_2=C(CH_3)-$, and mixtures thereof; and
(g) the composition contains (i) from about 1 part of copolymer per hundred parts of diol bis(allyl carbonate) to about 35 parts of the acrylate polymer per hundred parts of diol bis(allyl carbonate); and (ii) from about 1 part of the multifunctional acrylate monomer per hundred parts of diol bis(allyl carbonate) to about 20 parts of the acrylate monomer per hundred parts of diol bis(allyl carbonate); said composition having a pseudoplastic rheology with a shear stress of from $10^4$ to $10^7$ dynes per square centimeter at shear rates of from $10^1$ to $10^4$ per second.

9. The polymeric product of a monomeric composition of
(a) an aliphatic diol bis(allyl carbonate);
(b) an acrylate polymer; and
(c) a multifunctional acrylate monomer.

10. The polymeric product of claim 9 wherein said monomeric composition contains from about 1 part of acrylate polymer per hundred parts of diol bis(allyl carbonate) to about 100 parts of acrylate polymer per hundred parts of diol bis(allyl carbonate).

11. The polymeric product of claim 10 wherein said monomeric composition contains from about 1 part of multifunctional acrylate monomer per hundred parts of diol bis(allyl carbonate) to about 20 parts of multifunctional acrylate monomer per hundred parts of diol bis(allyl carbonate).

12. The polymeric product of claim 11 wherein the diol bis(allyl carbonate) monomer is represented by the formula $$R_1-O-\overset{\overset{O}{\|}}{C}-O-R_2-O-\overset{\overset{O}{\|}}{C}-O-R_3$$

where $R_1$ and $R_3$ are allyl groups independently represented by the formula $$\begin{array}{c} R^1 \\ | \\ H_2C=C-CH_2- \end{array}$$

where $R^1$ is chosen from the group consisting of hydrogen, fluorine, chlorine, bromine, and $C_1$ to $C_4$ alkyl groups, and $R_2$ is chosen from the group consisting of alkylene groups, alkylene ether groups, alkylene polyether groups, alkylene carbonate groups, and mixtures thereof.

13. The polymer product of claim 9 wherein the polymer is represented by the formula:

$$\begin{array}{cc} -(R_4)- & -(R_5)- \\ | & | \\ C=O & C=O \\ | & | \\ O & O \\ | & | \\ R_6 & R_7 \end{array}$$

where $R_4$ (CO)OH and $R_5$ (CO)OH are independently chosen from the group consisting of acrylic acid, methacrylic acid, ethyl acrylic acid, propyl acrylic acid, and butyl acrylic acid, $R_6$ (OH) is allyl alcohol, and $R_7$ is chosen from the group consisting of H, and $C_1$ to $C_4$ alkyl groups.

14. The polymeric product of claim 9 wherein the multifunctional acrylate monomer is represented by the formula $$(R_9)_z-(O-\overset{\overset{O}{\|}}{C}-R_8)_n$$

where n is from 2 to 5; $R_9$ is chosen from the group consisting of alkylene groups, alkylene ether groups, alkylene carbonate groups, and mixtures thereof; and $R_8$—(CO)OH is an chosen from the group consisting of acrylic acid, methacrylic acid, ethyl acrylic acid, and mixtures thereof.

15. In a method of polymerizing a monomeric composition of a diol bis(allyl carbonate) having an acrylate polymer dispersed therethrough, the improvement comprising providing a multifunctional acrylate monomer in the monomeric composition.

16. The method of claim 15 wherein said monomeric composition contains from about 1 part of acrylate polymer per hundred parts of diol bis(allyl carbonate) to about 35 parts of acrylate polymer per hundred parts of diol bis(allyl carbonate).

17. The method of claim 15 wherein said monomeric composition contains from about 1 part of multifunctional acrylate monomer per hundred parts of diol bis(allyl carbonate) to about 20 parts of multifunctional acrylate monomer per hundred parts of diol bis(allyl carbonate).

18. The method of claim 15 wherein said monomeric composition contains: (a) from about 1 part of acrylate polymer per hundred parts of diol bis(allyl carbonate) to about 35 parts of acrylate polymer per hundred parts of diol bis(allyl carbonate); and (b) from about 1 part of multifunctional acrylate monomer per hundred parts of diol bis(allyl carbonate) to about 20 parts of multifunctional acrylate monomer per hundred parts of diol bis-(allyl carbonate); said composition having a pseudoplastic rheology with a shear stress of from $10^4$ to $10^7$ dynes per square centimeter at shear rates of from $10^1$ to $10^4$ per second.

19. The method of claim 15 wherein the diol bis(allyl carbonate) monomer is represented by the formula

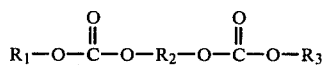

where $R_1$ and $R_3$ are allyl groups independently represented by the formula

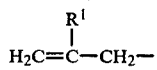

where $R^1$ is chosen from the group consisting of hydrogen, fluorine, chlorine, bromine, and $C_1$ to $C_4$ alkyl groups, and $R_2$ is chosen from the group consisting of alkylene groups, alkylene ether groups, alkylene polyether groups, alkylene carbonate groups, and mixtures thereof.

20. The method of claim 15 wherein the acrylate polymer is represented by the formula:

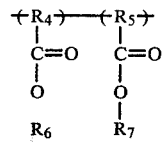

where $R_4$ (CO)OH and $R_5$ (CO)OH are independently chosen from the group consisting of acrylic acid, methacrylic acid, ethyl acrylic acid, propyl acrylic acid, and butyl acrylic acid, $R_6$ (OH) is allyl alcohol, and $R_7$ is chosen from the group consisting of H, and $C_1$ to $C_4$ alkyl groups.

21. The method of claim 15 wherein the multifunctional acrylate monomer is represented by the formula

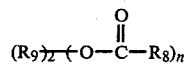

where n is from 2 to 5; $R_9$ is chosen from the group consisting of alkylene groups, alkylene ether groups, alkylene carbonate groups, and mixtures thereof; and $R_8$—(CO)OH is chosen from the group consisting of acrylic acid, methacrylic acid, ethyl acrylic acid, and mixtures thereof.

* * * * *